April 23, 1968

J. LOVRICH 3,379,159

ANTISEASICKNESS CABIN

Filed Feb. 13, 1967

INVENTOR.
John Lovrich

United States Patent Office 3,379,159
Patented Apr. 23, 1968

3,379,159
ANTISEASICKNESS CABIN
John Lovrich, 307 S. Middletown Road,
Nanuet, N.Y. 10954
Filed Feb. 13, 1967, Ser. No. 615,695
2 Claims. (Cl. 114—189)

ABSTRACT OF THE DISCLOSURE

A ship cabin or room, the cabin having a heavier weight at its lower end so that it remains upright, and the cabin being supported in a gimbal ring pivotally secured to a deck of a ship so as to permit, universally, movement of the cabin, so to prevent seasickness to the occupants within it when the ship is rolling and pitching.

This invention relates generally to ships, and more particularly it relates to pitch and roll elimination devices for ships.

A principal object of this invention is to provide an antiseasickness cabin for ships so as to obtain equilibrium of a ship cabin against rolling and pitching when the vessel is in rough seas, thereby preventing seasickness to the passengers within the cabin.

Another object of the present invention is to provide an antiseasickness cabin which may be of any size so as to accommodate a single passenger or several and which will allow them to sleep and otherwise live in contentment without the danger of seasickness.

Another object of the present invention is to provide an antiseasickness cabin which is for use particularly as a hospital room aboard a ship.

Yet another object of the present invention is to provide an antiseasickness cabin which is freely supported within a gimbal ring and which is weighted so that the same remains upright without tilting while the ship is rolling and pitching.

Other objects of this invention are to provide an antiseasickness cabin which is simple in design, inexpensive to manufacture, rugged in construction, easy to use and efficient in operation.

These and other objects will be readily evident upon a study of the specification and the accompanying drawing wherein.

Figure 1:
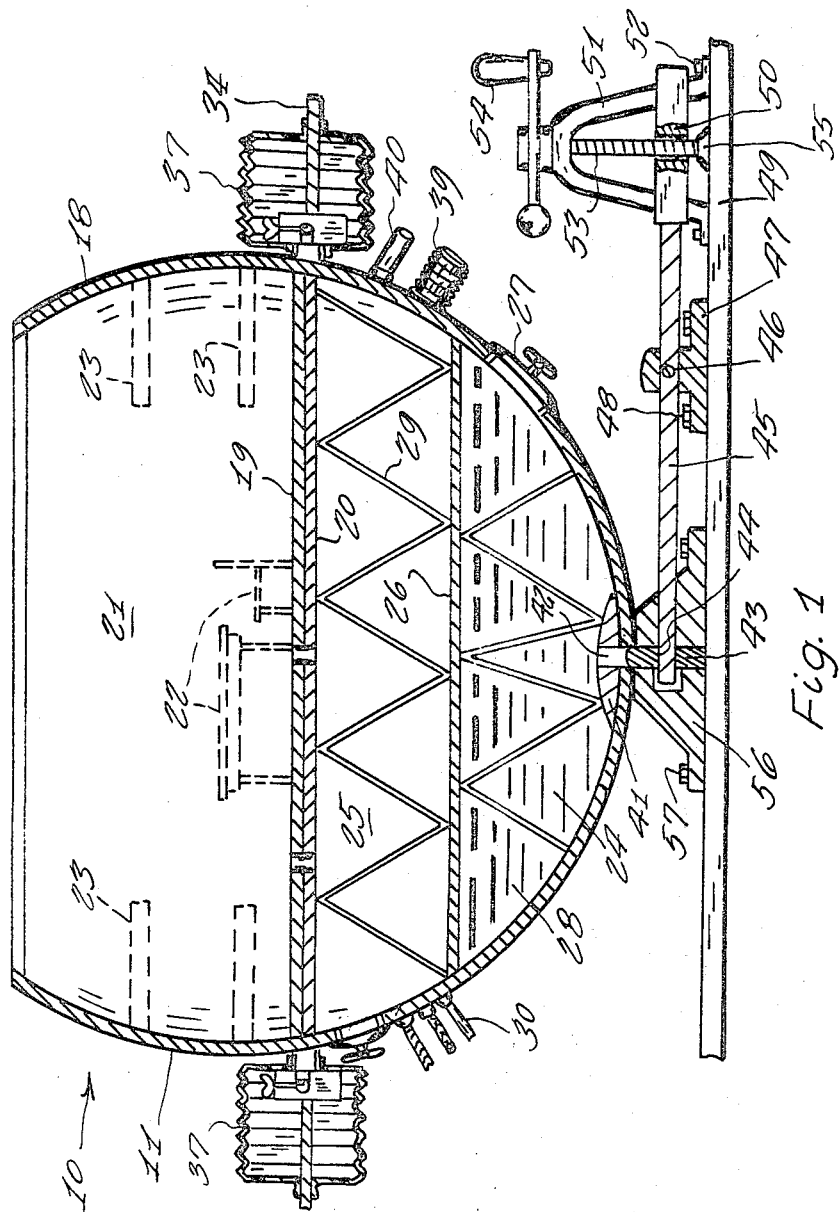
FIGURE 1 is a side cross-sectional view of the present invention.

Referring now to the drawing in detail, the reference numeral 10 represents an antiseasickness cabin, according to the present invention, wherein there is a generally spherical housing 11 which is supported at opposite ends by means of stubshafts 12 supported in bearings 13 in opposite ends of a circular gimbal ring 14.

The gimbal ring 14 is in turn supported at opposite ends by a stubshaft 15 supported in bearings 16 which are located along a fore and aft axis of a ship 17. It is to be noted that the gimbal ring is supported in a horizontal plane and the stubshafts 12 and 15 are accordingly all at the same elevation as shown.

The housing 11 is comprised of a spherical shell 18 having a platform 19 of circular configuration, extending across a diametric portion thereof, the platform 19 being supported upon a pair of cross-arms 20 extending in opposite directions, a cross-arm being supported to the sides of the shell wall. Thus a room 21 is located above the platform 19 within which furniture 22 may be placed so as to provide living quarters for passengers. The room 21 may further include bunk beds 23 and all other necessities so as to accommodate passengers during the day and night.

The lower portion of the spherical housing is divided into a pair of compartments 24 and 25 by means of a horizontally extending circular wall 26. The lower compartment 24 thereof is provided with an access door 27 and with means for piping in a quantity of water 28 which is filled to the top thereof for the purpose of providing weight to the lower end of the spherical housing. If preferred a mass of concrete may be substituted for the water weight, however, the use of water is preferred in view that it may be more conveniently placed therein and removed, should it be necessary. The compartment 25 is provided with a plurality of baffles or braces 29 to form a supporting truss between the platform 19 and wall 26, the compartment 25 serving as a space for containing various utility lines and other equipment so as to provide comfort to the persons in the room 21, such utilities including electric wiring, air conditioning unit, hot and cold water lines, telephone wiring, plumbing to a toilet and shower as well as possibly even including fresh water tanks if necessary. It is to be noted that the wiring, pipes and other hoses within the compartment 25 that extend outwardly from the spherical housing as shown at 30, be allowed sufficient play so as not to arrest the free movement of the housing respective to the ship to which these lines or hoses may be connected.

Figure 2:
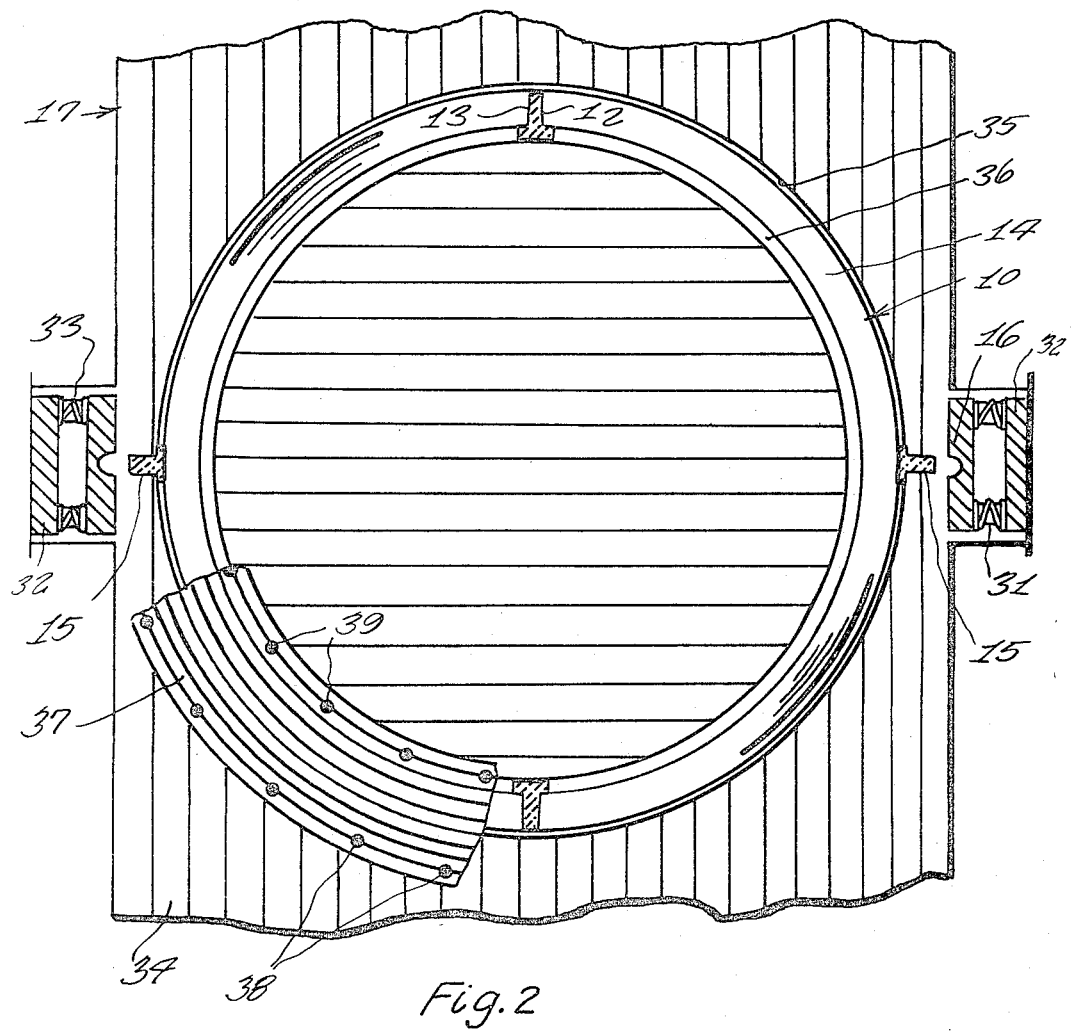
FIGURE 2 is a top plan view thereof and showing the shock absorbing means disposed on each side of the cabin.

The bearings 16 are horizontally slideable along stubshafts 31 secured upon supports 32, as shown in FIGURE 2 of the drawing. A compression coil spring 33 is fitted around each stubshaft 31, the compression coil spring 33 bearing at one end against the bearing 16 and against the support 32 at its opposite side, thereby providing a shock absorbing means between the vessel and the gimbal ring supporting the spherical housing. The support 32 is mounted upon a deck 34 of a ship, the support being located on a fore and aft axis of the ship.

In order to provide unrestricted movement of the spherical housing, a gimbal ring respective to the deck 34 of the ship, a space 35 and 36 is located between the parts, as shown in FIGURE 2 of the drawing. An accordion-pleated rubber flange 37 is fitted around the spherical housing so to cover the spaces 35 and 36 between the moveable parts and so to provide a secure walking space for passengers during movement within the cabin room 21 and upon the deck 34. The rubber flange is secured by means of fasteners 38 along the outer edge thereof, to the upper side of the deck 34 and by means of fasteners 39 to the spherical housing.

As shown in FIGURE 1 of the drawing, an accordion-type rubber hose connection 39 secured to the spherical housing provides flexible means for plumbing connections between the ship and the cabin. Likewise, a rubber hose 40 serves as a fresh water line from the ship to the cabin room.

At the lower end of the spherical housing, a steel base 41 is secured to the inner side of the housing, the steel base having a central opening 42 extending vertically upward therethrough for purpose of receiving there into an upwardly slideable lock pin 43 which secures the spherical housing from being free to move relative to the ship, when so preferred. The lock pin 43 has an opening 44 therein, into which there is received one end of a horizontally extending lever bar 45. The lever bar is secured pivotally at a mid-portion on a pin 46 secured to a base bracket 47 that is screwed down by means of bolts 48 to a ship deck 49. The opposite end of the lever bar is of square cross-sectional configuration, and has a screw piece 50 there in, the lever bar having a relatively enlarged opening for receiving the screw piece in a loose fit; an upstanding bracket 51 secured by bolts 52 to the deck 49 supports a vertically extending threaded shaft 53 threadingly engaged at its upper end with the bracket 51, the threaded shaft being provided at its upper terminal end with a crank handle 54. The lower end of the threaded shaft 53 extends through the screw piece 50, the lower end of the threaded shaft having a bearing plate 55, that may be selectively locked against the upper side of the deck 49. It is to be noted that the opening 44 in the lock pin is of generally square or rectangular cross-sectional configuration, and is of a loose fit with the lower bar of like cross-sectional configuration. A base bracket 56 secured by means of bolts 57 to the deck 49 provides means for containing the slideable lock pin 43. Thus there has been provided a means for locking the spherical housing when the sea is relatively calm and there is no danger of a person becoming sea-sick.

In operative use, when the weather becomes rough and the ship begins to pitch and roll, the lock pin is disengaged from the opening 42 in the steel base 41 of the spherical housing, and thereby free the spherical housing so to be able to be free of the ship's pitch and roll.

While various changes may be made in the detailed construction, it is understood that such changes will be within the spirit and scope of the present invention as is defined by the appended claims.

I claim:
1. In a ship having self-contained means to prevent seasickness, a combination of a plurality of cabins, said cabins being supported in universally free pivotal relation relative to said ship, each of said cabins comprising a spherical housing supported at opposite ends by means of stub shafts within bearings on opposite sides of a gimbal ring, said gimbal ring having a stub shaft at opposite ends, said stub shaft being located along an axis which is 90 degrees to the axis of said bearing of said gimbal ring, said stub shaft of said gimbal ring being supported within bearings supported shock-free upon a deck of said ship, said spherical housing comprising a circular platform across the diametrical center of said spherical housing to form a floor for a compartment thereabove comprising a cabin for passengers, said flooring being supported upon a pair of cross-bars, a pair of compartments below said platform, a lowermost of said compartments being supported and spaced from the upper of said lower compartments by means of a horizontally extending wall, said lowermost compartment comprising a space for water to serve as a ballast for said spherical housing, said compartment above said lowermost compartment containing said water comprising a space to receive therein various utility wires, plumbing lines and the like for communication between said passenger cabin and the ship, said lines and wiring having a slack therein between said spherical housing said ship to prevent limited movement of said spherical housing relative to said ship, a space between said spherical housing and said gimbal ring, a space between said gimbal ring and said deck of said ship, said spaces being covered over by an accordion-pleated rubber flange so to provide a walking surface for passengers between said deck of said ship and said cabin and to said spherical housing, said rubber flange being secured along its peripheral edge by means of fasteners to said deck and by means of fasteners to said spherical housing thereby covering said space between said spherical housing and said gimbal ring and said deck.

2. The combination as set forth in claim 1, wherein said spherical housing is provided with lock means to prevent said movement between said housing and said ship, said means comprising a steel base at the lower end of said spherical housing and secured to the inner side thereof, said steel base having a vertically extending central opening therethrough for receiving a vertical slideable lock pin contained within a base bracket secured to the upper side of a lower deck, said lock pin having a square configurated horizontally extending opening therein for loosely receiving one end of a lever-bar, said lever-bar being pivoted at an intermediate portion about a pin secured to a base bracket mounted upon the upper side of said lower deck, and the opposite end of said lever bar having a square opening therethrough for loosely receiving a screw piece carried within said opening, an upstanding bracket at said opposite end of said lever bar, said bracket supporting the upper end of a threaded shaft, said threaded shaft having at its terminal end a hand crank, said threaded shaft extending through said screw piece and having a bearing plate at its lower end for securement against the lower upper side of said deck.

References Cited
UNITED STATES PATENTS

| | | | |
|---|---|---|---|
| 2,077,143 | 4/1937 | Carroll | 114—125 |
| 2,153,877 | 4/1939 | Waller | 114—189 |

FERGUS S. MIDDLETON, *Primary Examiner.*

TRYGVE M. BLIX, *Examiner.*